Patented Dec. 19, 1950

2,534,217

UNITED STATES PATENT OFFICE 2,534,217

LUBRICANT COMPRISING REACTION PRODUCT OF AN OLEFIN, A PHOSPHORUS SULFIDE, AND WATER

John D. Bartleson, East Cleveland, Ohio., assignor to The Standard Oil Company, Cleveland, Ohio, a corporation of Ohio No Drawing. Application April 6, 1948, Serial No. 19,446

12 Claims. (Cl. 252—46.6)

This invention relates to lubricants and lubricant additives comprising a reaction product of an olefin, a phosphorus sulfide and water.

Lubricants comprising such reaction products are suitable for use under various conditions, including high temperatures or high pressures or both; as, for instance, use in an internal combustion engine operating at high temperatures and in which the lubricant is in close contact with metallic surfaces, metal compounds and high temperature gases. They are also suitable as extreme pressure lubricants in oils and greases.

The art is confronted with the problem of providing a lubricating oil addition agent which imparts to the oil no undesirable properties, but improves the properties of the oil, such as decreasing its oxidative deterioration, sludge formation, and the like; especially an agent which is nearly optimum for all these factors, at a commercially interesting cost. It is also important that the addition agent be of light color so as not to darken the oil unduly, and that it be completely soluble in the oil so as not to settle on long standing.

It has been proposed heretofore to react an olefin with a phosphorus sulfide to form an additive for lubricating oils. It has also been found that if this additive was extracted with a selective solvent such as pentane, a substantial portion is insoluble and this raffinate is a heavy black material of very poor additive properties; it is also oil insoluble and an oil to which it is added is of poor color and clarity. The extract, or the portion soluble in the pentane, was a light colored product having greatly improved additive properties and excellent oil solubility. This suggested that a material was being formed during the sulfide-olefin reaction which is detrimental to the color and oil solubility of the additive, as well as its oil improving properties, and should be removed. However, the labor involved and the loss due to extraction makes this procedure less attractive commercially. It was thought that if some way could be found to modify the reaction it might be conducted so that the entire reaction mass approached the properties of the extract described above.

In accordance with the invention, it has been found that an excellent reaction product may be obtained by reacting an olefin with phosphorus sulfide and a critical amount of water; this produces a reaction product very low in components which are insoluble in pentane and oil. This reaction product is an excellent lubricant or additive for lubricants, in that it lessens the corrosions, the lacquer and sludge formation, the viscosity increase, and the like characteristics thereof. It also improves the extreme pressure lubricating characteristics of oils and greases. What is particularly important is the solubility and light color of the reaction product. Oils containing the same have good clarity and an absence of sediment. Oils and greases containing the reaction product have a much lighter color.

The above reaction products may be used as anti-oxidants or stabilizers for organic materials which are subject to oxidative deterioration, e. g., elastromers, rubber, asphalt, plastic materials, waxes, coating materials, paints, fats and fatty oils, gasoline, and the like.

The objects achieved in accordance with the invention include the provision of an agent which may be useful itself as a lubricant which is of good color and completely soluble in an oil, and which when added to lubricants will markedly inhibit the very objectionable deposition of lacquer, and, at the same time, inhibit acid and sludge formation, corrosion and other types of deterioration occurring under operating conditions; the provision of lubricating oils containing such an addition agent; and other objects which will be apparent as embodiments of the invention are disclosed hereinafter.

The reaction product may be made in the presence of a diluent, if desired, which may or may not be subsequently removed. A heavy oil such as white oil, or a lubricating oil having about the same properties as that to which the new composition is to be added may be used as a diluent. The reaction is usually complete in about 10 hours or less time, generally 1 to 2 hours. The reaction time is a function of the temperature, the amount of the sulfide that is to react, the subdivision of the reactants, the efficiency of mixing, etc.

In forming the reaction product, from 0.2 to about 2.0 mols of the phosphorus sulfide are used per mol of olefin, preferably from 0.25 to about 0.75 mol of the sulfide. The amount of water should be fairly closely controlled as will be seen from the examples hereinafter. Generally from 0.5 to about 3.0 mols of water are used per mol of the phosphorus sulfide used in forming the reaction product, preferably from 1 to 1.6 mols of water.

Phosphorus pentasulfide is preferred and is most economic and readily available. For this reason it is used in the illustrative examples.

In general, olefins having a least 6 carbon atoms in the molecule are suitable, including high molecular weight olefin polymers, as is known to the art. Mono-olefins are preferred. Their molecular weight generally ranges above 150 and such polymers are known which have a molecular weight in the range of about 3,000 to about 50,000.

The advantages of the invention are particularly apparent in the case of products obtained from unsaturated hydrocarbons having from about 6 to about 16 carbon atoms in the molecule. A commercially desirable olefin is so-called "motor polymer" which term includes "reduced motor polymer." Motor polymer is made from $C_3$ and $C_4$ olefins by non-selective polymerization, e. g., with a phosphorus acid type catalyst. Motor polymer boils in the range of 80° to 600° F., with 50% boiling in the range of 120° to 400° F. and 75% boiling in the range of 190° to 360° F., thus indicating that the bulk of the material is in the $C_8$–$C_{10}$ olefin range with some lighter and heavier ends. The olefins are fairly well branched and contain little or no di-olefins.

A polymer gasoline fraction may be removed therefrom by fractional distillation to the 250° F. cut point, and this reduced motor polymer is particularly useful. The reduced motor polymer may contain small amounts of materials lighter than the trimer. Its average molecular weight is about 140 to 150 and it preferably contains a major amount of branched chain olefins boiling below 600° F. The unsaturated hydrocarbon used should be selected, e. g., of a suitable molecular weight, to give a final product having the desired oil solubility or dispersibility. It is preferred to employ unsaturated compounds which are soluble or dispersible in lubricating oil. Polyolefins may be used, but conjugated polyolefins giving an undue amount of sludge would not be preferred.

The reaction may or may not be carried out in the presence or absence of air, or in the atmosphere of inert or non-deleterious gas, such as nitrogen or $H_2S$. It may or may not also be carried out under pressure, e. g., the pressure generated when the reaction is carried out in a closed vessel.

The reaction temperature varies with unsaturated compound and is readily ascertained. The optimum is in the range of 200° to 500° F., although a higher temperature which is below that at which the reaction product would be decomposed could be used. A temperature of at least 250° to 300° F. is preferred in many cases.

The final reaction mass is preferably centrifuged or filtered to remove any by-product sludge, or other insoluble material. Any excess of a volatile reactant, or a volatile diluent, if one is used, may be removed by distillation. If desired, the final product may be solvent extracted with a suitable solvent, e. g., liquid propane or isopropyl alcohol, or contacted with an adsorbent such as activated charcoal, silica gel, activated clay, and the like.

Any of the additives made in accordance with the invention may be converted to the corresponding basic derivatives thereof by reaction with the corresponding basic compound. For example, they may be reacted with the alkali metal or alkaline earth metal oxide, hydroxide, carbonate as well as salt such as cyanamide and carbide. Other metals are aluminum, arsenic and metals higher in the electromotive series. Ammonia and nitrogen bases, such as amines, etc. may be used. The amount of the basic compound may be sufficient to neutralize all or part of the acidity of the additives and this reaction is generally carried out at an elevated temperature in the range of 180° to 350° F. in order to complete the neutralization. The art understands the neutralizing step in itself and this may be applied to the additives made in accordance with the invention to achieve the properties characteristic of the basic or neutralized derivatives and to retain the superior property of the additives of the invention. A reference to the reaction product includes the basic or neutralized derivatives.

The amount of the final reaction product (i. e., the additive) to be incorporated in an oil or grease will depend upon the characteristics of the oil or grease and the intended use. Some oils have more of a tendency to corrode metals, or to form acids, sludges and lacquer deposits than others, and such oils require larger quantities of the addition agent. Also, oils that are intended for higher temperatures require larger amounts of the additive. In general, the range is from about 1 to about 10%; under some circumstances, amounts as low as about 0.01% show a significant improvement. Since the secondary reaction product is a lubricant, there is no upper limit. However, it may be uneconomical to include in the lubricant more of the secondary reaction product than is necessary to impart the desired properties, such as 50%.

In order to illustrate and point out some of the advantages of the invention, but in no sense as a limitation thereof, the following specific embodiments are included.

The following examples are given as illustrative of the prior art and for the purpose of comparison with the invention.

EXAMPLE A 38 parts by weight of $P_2S_5$ is mixed with 62 parts of reduced motor polymer and agitated for 2 hours at 350° F. in a pressure reaction vessel, at a pressure of about 100 pounds per square inch. Some gas is vented during the reaction, depending upon the free space in the vessel, in order to maintain this pressure. A 100% yield is obtained, based on the motor polymer, and no sludge is formed, but it is preferred to filter the reaction product. The product contains 30.7% by weight of pentane insolubles. This product is referred to as additive A hereinafter.

EXAMPLE B 100 parts by weight of reduced motor polymer is mixed with 13.5 parts by weight of clay (which clay contains 20% by weight of water), heated slowly to 250° F., and maintained at this temperature for 15 minutes, with agitation. There is a weight loss of 1 part by weight.

Following the procedure of Example A, 38 parts by weight of $P_2S_5$ and 62 parts by weight of the above clay-treated reduced motor polymer are reacted. The product contains 30.1% by weight of pentane insolubles. This product is referred to as additive B hereinafter.

EXAMPLE C

Following the procedure of Example A, 38 parts by weight of $P_2S_5$ and 62 parts by weight of reduced motor polymer are reacted in the presence of 8 parts by weight of anhydrous clay which had been dried for 45 minutes at 1100°–1200° F. The product contains 35.4% by weight of pentane insolubles. This product is referred to as additive C hereinafter.

The following examples are illustrative of the invention.

EXAMPLE 1

(a) Following the procedure of Example A, 38 parts by weight of $P_2S_5$, 62 parts by weight of reduced motor polymer, and 4 parts by weight of water are reacted. The product contains only 3.5% by weight of pentane insolubles. This product analyzes 24.57% S and 8.93% P, and is referred to as additive 1 hereinafter. This may be modified by varying the proportions from 20 to 50 parts of sulfide to 80 to 50 parts of the olefin.

(b) The reaction product Example 1 (a) was converted to the corresponding metal derivative by reaction with 10% KOH for 1 hour at 250° F.

EXAMPLE 2

Following the procedure of Example A, 38 parts by weight of $P_2S_5$, 62 parts by weight of reduced motor polymer, and 8 parts by weight of water are reacted. The product contains 2.9% by weight of pentane insolubles. This product is referred to as additive 2 hereinafter.

EXAMPLE 3

Following the procedure of Example A, 38 parts by weight of $P_2S_5$, 62 parts by weight of reduced motor polymer, and 2 parts by weight of water are reacted. The product contains 14.7% by weight of pentane insolubles. This product is referred to as additive 3 hereinafter.

EXAMPLE 4

Following the procedure of Example A, 38 parts by weight of $P_2S_5$, 62 parts by weight of reduced motor polymer, is reacted in the presence of 20 parts by weight of clay containing 4 parts of adsorbed water. The product contains 2.8% by weight of pentane insolubles. This product is referred to as additive 4 hereinafter.

EXAMPLE 5

Following the procedure of Example A, 38 parts by weight of $P_2S_5$, 62 parts by weight of reduced motor polymer, and 4 parts by weight of water are reacted in the presence of 2.5 parts of clay (which clay contains 20% by weight of water). The product contains 4.9% by weight of pentane insolubles. This product is referred to as additive 5 hereinafter.

EXAMPLE 6

38 parts by weight of $P_2S_5$ and 4 parts of water were charged to a stirred bomb and heated at 310° F. for two hours. 38 parts of this reaction mixture is then mixed with 62 parts by weight of reduced motor polymer and reacted in accordance with the procedure of Example A. The reaction product contains 8.6% by weight of pentane insolubles. This product is referred to as additive 6 hereinafter.

EXAMPLE D

If a sample of the Example A product is mixed with 5.5% by weight thereof of water, and heated 8 hours at 350° F., the pentane insolubles content is not brought down anywhere near that of the reaction product of Examples 1 or 2.

The properties of the reaction products are tabulated as follows

TABLE I

| Example | Parts of Water | Parts, Clay | Pentane, Insoluble | Viscosity, cs., 100° F. |
|---|---|---|---|---|
| | | | Per cent | |
| A | 0 | 0 | 30.7 | 4.463 |
| B | 0 | 0 | 30.1 | (¹) |
| C | 0 | 8 | 35.4 | 1.935 |
| 1 (a) | 4 | 0 | 3.5 | 101 |
| 2 | 8 | 0 | 2.9 | (¹) |
| 3 | 2 | 0 | 14.7 | (¹) |
| 4 | 4 | 16 | 2.8 | 98 |
| 5 | 4 | 2.5 | 4.9 | (¹) |
| 6 | 3.1 | 0 | 8.6 | (¹) |

¹ Not measured.

Examples A, B and C which are made without water show high pentane-insolubles and therefore show poor oil solubility. This property, in addition to their high viscosity, indicates that some high polymeric material is being formed. Example B shows that the treatment of the olefin with clay and water before the reaction with the sulfide did not alter the result because the water is lost before the reaction with the sulfide. Example C shows that the presence of clay without water does not alter the results.

Example 1 (a) and Example 2 show the low amount of pentane-insolubles obtained when 4% and 8% of water are used. Example 1 (a) also shows the low viscosity obtained which is clearly indicative of a different result. Example 3 shows that 2% water is too small for optimum low pentane-insolubles. Examples 4 and 5 show that the presence of clay does not alter the result as long as the optimum amount of water is present. Products of these examples are to be contrasted with Example C.

Example 6 shows that the sulfide may be treated with water before the reaction with the olefin. While I do not intend to be limited to any theory of what takes place in my invention, it is possible that the water and the phosphorus pentasulfide react to form phosphorus sulfoxides of the formula $P_2S_2O_3$ or $P_2S_3O_2$ or mixtures thereof in the form of $P_4S_4O_6$ or $P_4S_6O_4$ or mixtures thereof. If this is the correct explanation, it is possible that a sulfoxide is formed in situ in the presence of the olefin and is the component which reacts with the olefin to obtain the improved result.

In the above examples the great lowering of the pentane-insolubles by itself establishes the utility of the invention, since a high amount of a pentane-insoluble fraction in an additive or in a used oil is undesirable as indicative of a large amount of material which is insoluble in oil. The consumer resistance to an oil in which anything has settled out as a layer as a result of the presence of an insoluble additive is too obvious for comment and this may even be harmful for many purposes.

However, in order to test the additives in actual operation, they were added to an oil and tested by the Sohio Corrosion Test used in evaluating lubricants made in accordance with the invention. This test is described in a co-pending application of E. C. Hughes, J. D. Bartleson, M. L. Sunday and M. M. Fink, which also correlates the results of the laboratory tests with a Chevrolet Engine Test.

Essentially the laboratory test equipment consists of a vertical thermostatically heated glass test tube (45 mm. outside diameter and 42 cm. long), into which is placed the corrosion test unit. An air inlet is provided for admitting air into the lower end of the corrosion unit in such a way that in rising the air will cause the oil and suspended material therein to circulate into the corrosion unit. The tube is filled with an amount of the oil to be tested which is at least sufficient to submerge the metals being tested.

The corrosion test unit essentially consists in a circular relatively fine grained copper-lead test piece of $\frac{7}{8}''$ O. D., which has a $\frac{1}{4}''$ diameter hole in its center (i. e., shaped like an ordinary washer). The test piece has an exposed copper-lead surface of 3.00 sq. cm. Of this surface area, 1.85 sq. cm. acts as a loaded bearing, and is contacted by a part of the cylindrical surface of a hardened steel drill rod ($\frac{1}{4}''$ diameter and $2\frac{1}{2}''$ long, and of 51–57 Rockwell hardness).

The drill rod is held in a special holder, and the holder is rotated so that the surface of the drill rod which contacts the bearing sweeps the bearing surface (the drill rod is not rotated on its own axis and the surface of the drill rod which contacts the bearing is not changed).

The corrosion test unit means for holding the bearing and the drill rod is a steel tubing (15'' long and $1\frac{1}{32}''$ O. D.) which is attached to a support. A steel cup (1'' long, $1\frac{1}{32}''$ O. D. by $\frac{13}{16}''$ I. D.) is threaded into the steel tube, at the lower end. The cup has a $\frac{3}{8}''$ diameter hole in the bottom for admitting the oil into the corrosion chamber. The copper-lead test piece fits snugly into the steel cup and the hole in the test piece fits over the hole in the steel cup. A section of steel rod ($\frac{3}{8}''$ in diameter and 19'' long) serves as a shaft and is positioned by two bearings which are fixedly set in the outer steel tubing, one near the top and one near the lower (threaded) end thereof. Several holes are drilled just above and just below the lower bearing. The holes above the bearing facilitate cleaning the apparatus, while the holes below the bearing enable the circulation of oil through the corrosion chamber. The drill rod holder is connected to the shaft by a self-aligning yoke and pin coupling. This assures instantaneous and continuous alignment of the drill rod bearing member against the bearing surface at all times. A pulley is fitted to the top of the steel shaft and the shaft is connected therethrough to a power source. The shaft is rotated at about 675 R. P. M.; and the weight of the shaft and attached members is about 600 grams, which is the gravitational force which represents the thrust in the bearing. The air lift from the air inlet pumps the oil through the chamber containing the test piece and out through the holes in the steel tubing.

The ratios of surface active metals to the volume of oil in an internal combustion test engine are nearly quantitatively duplicated in the test equipment. The temperature used is approximately that of the bearing surface. The rate of air flow per volume of oil is adjusted to the same as the average for a test engine in operation. Of the catalytic effects, those due to soluble iron are the most important. They are empirically duplicated by the addition of a soluble iron salt. Those due to lead-bromide are duplicated by its addition.

The test was correlated with the L–4 Chevrolet test, and a slightly modified version of this test. The modified test comprised reducing the oil additions from the 4 quarts in the usual procedure to 2 quarts, by reducing the usual 1 pint oil additions which are made at 4 hour intervals to $\frac{1}{2}$ pint additions. This modification increases the severity of the test in its corrosion and detergency components, particularly in the case of border line oils.

For each test, the glass parts are cleaned by the usual chromic acid method, rinsed and dried. The metal parts are washed with chloroform and carbon disulfide and polished with No. 925 emery cloth or steel wool. A new copper-lead test piece is used for every test. The test piece is polished before use, on a surface grinder to give it a smooth finish. The test piece is weighed before and after the test on an analytical balance to evaluate the corrosion. After placing the oil and corrosion test unit in the tube, and bringing the assembly up to temperature in the thermostat, soluble catalyst is added and the air flow is started. Lead bromide catalyst is added immediately after starting the air, and timing of the test is begun.

The laboratory test conditions which were found to correlate with the Chevrolet procedure 36-hour test are shown in the following table:

Temperature—325° F.
Oil sample—107 cc.
Air flow rate—70 liters/hour
Time—10 hours
Catalysts—Steel. Copper-lead bearing: 3 sq. cm. area of which 1.85 sq. cm. is a bearing surface. Ferric 2-ethyl hexoate: 0.05% as $Fe_2O_3$ in C. P. benzene. Lead bromide: 0.1% as precipitated powder.
Bearing assembly:
 Load—600 grams
 Speed—675 R. P. M.

By extending the laboratory test to 20 hours, it was found that correlation with the Chevrolet 72-hour test could be obtained.

At the close of the test period, the extent of corrosion is determined by reweighing the corrosion test piece and determining the change in weight due to the test. An accurate evaluation of the lacquering properties of an oil is obtained by a visual rating system which is applied to the outer surface of the corrosion unit steel tube and metal cup in much the same way that the piston skirt, cylinder wall, etc. of an engine are rated for varnishes. The sludge rating of the engine is simulated by a visual rating of the insoluble materials and used oil which are coated on the glass test tube at the conclusion of the test. For both sludge and varnish rating a scale of A (best) to F (worst) is used.

A sufficient volume of used oil is obtained from the test for determination of the usual used oil properties, such as pentane insolubles, viscosity increase, neutralization number and optical density.

The data in the following table typifies the results obtained in 20-hour Sohio Corrosion Tests at 325° F. on the hydrocarbon lubricating oil base stock, and the improved lubricants prepared therefrom in accordance with the invention.

TABLE II

*Conventional solvent refined lubricating oil containing 1.5% by weight of additive*

| Additive of Example No. | 0 (Blank) | A | 1 | 2 | 4 |
|---|---|---|---|---|---|
| Amount of water used in preparation_____percent__ | -------- | 0 | 4 | 8 | 4 |
| Corrosion of Cu-Pb (in mgms. weight loss of)___ | 40.1 | 113.2 | 28.5 | 45.4 | 15.5 |
| Viscosity Increase (SUS)_____ | 4,070.0 | 76.0 | 52.0 | 835.0 | 66.0 |
| Pentane Insolubles (in mgm./ 10 g. of lubricant)_____ | 25.8 | 1.68 | 0.58 | 4.73 | 0.51 |

The above examples and test data show that reaction products obtained in accordance with the invention are clearly different than those obtained by corresponding procedures without inclusion of the water. The above data also show that 4% water (Example 1) is the optimum amount to be used. The use of 2% water (Example 3) does not lower the pentane insolubles as much as where 4% water is used as shown in Table I; and the use of 8% water (Example 2) gives a product showing poorer corrosion and viscosity increase characteristics. Water in an amount of 3 to 6%, based on the sulfide-olefin reaction components is preferred and 4% is optimum under the reaction conditions described. If the $P_2S_5$ is treated with the water before reaction with the olefin (Example 6), a desirable reaction product is obtained, but the simultaneous reaction of the $P_2S_5$, the water, and the olefin is to be preferred.

In order further to establish the utility of the additives made in accordance with the invention and to compare the superiority thereof with the prior art additives which are not made in the presence of water, various additives were tested by the L-4 Chevrolet Engine Test.

In this Chevrolet Engine Test, a conventional Chevrolet engine with a 216.5 cubic inch piston displacement and a compression ratio of 6.5 to 1 is used. Prior to each test, new piston rings and two new copper-lead bearing inserts are installed. The engine is operated at 3150 R. P. M. with a load of 30 brake horsepower and at a temperature at the jacket outlet of 200° F. Lubricating oil temperature is maintained at 265° F. for an SAE 10 grade oil and at 280° F. for oil SAE 30 to 50 grade. Fuel used contains from 2½ to 3 cc. of tetraethyl lead per gallon. The weight loss of test bearings is determined at the conclusion of the run and deposits in the power section are ascertained as well as the property of the used oil sampled at the end of the test. The engine is run for 36 hours. The following tests were made with the results indicated:

TABLE III

| Oil Used | | S. A. E. 20 | S. A. E. 20 | S. A. E. 20 |
|---|---|---|---|---|
| Additive | Example A | Example 1(a) | Example 1(a) | Example 1(b) |
| Amount of Additive percent | [1] 1½ | 1 | 1 | 1 |
| Varnish | 29.75 | 44.75 | 46.00 | 42.00 |
| Piston Skirt | 3.75 | 7.5 | 8.0 | 6.75 |
| Sludge | 38.5 | 46.75 | 44.50 | 49.00 |
| Total | 68.25 | 91.50 | 90.50 | 91.00 |
| Copper lead corrosion | 37 | 32.4 | 40 | 18 |
| Viscosity Increase | 71 | 51 | [2] | [2] |
| Pentane Insolubles, Weight percent | 0.9 | 1.38 | 0.99 | 0.99 |
| Neutralization number | 0.9 | 0.85 | 0.87 | 1.3 |

[1] Data on 1% not available.
[2] Not measured.

In the above examples it will be seen that all three of the compositions made in accordance with the invention give excellent total ratings of 90 to 91 and low corrosion values. This is to be contrasted with the run of Example A which represents prior art.

It is understood in the art that a blank oil without an additive is not included because it would not run for 36 hours or would damage the engine if run for this length of time.

If desired, the improved lubricants of the invention may be used in blends together with other lubricants or lubricant agents, e. g., with soap or the like in a grease. If desired, an agent for improving the clarity of the oil may be included, e. g., lecithin, lauryl alcohol, and the like. If desired, an agent for preventing foaming may be included, e. g., tetra-amyl silicate, an alkyl orthocarbonate, ortho-formate or ortho-acetate, or a polyalkyl silicone oil.

In view of the foregoing disclosure, variations and modifications of the invention will be apparent to those skilled in the art, and it is intended to claim such variations and modifications broadly, except as do not come within the scope of the appended claims.

I claim:

1. The reaction product of one mol of an olefin, 0.2 to 2.0 mols of a phosphorus sulfide, and 0.5 to 3 mols of water per mol of the phosphorus sulfide, the water being mixed and reacted with the phosphorus sulfide at least as soon as the olefin is mixed and reacted therewith, the reaction temperature being in the range of 200° to 500° F., to produce an oil dispersible reaction product suitable for addition to a lubricating oil.

2. The reaction product of one mol of an olefin, 0.2 to 2.0 mols of phosphorus pentasulfide, and 0.5 to 3 mols of water per mol of the phosphorus sulfide reacted together at a temperature in the range of 200° to 500° F. to produce an oil-dispersible reaction product suitable for addition to a lubricating oil to form a reaction product having less than 10% pentane insolubles.

3. The reaction product of one mol of an olefin, 0.2 to 2.0 mols of phosphorus pentasulfide, and 1 to 1.6 mols of water per mol of the phosphorus pentasulfide reacted together at a temperature in the range of 200° to 500° F. to produce an oil-dispersible reaction product suitable for addition to a lubricating oil.

4. The reaction product of one mol of an olefin, 0.25 to 0.75 mols of phosphorus pentasulfide, and 1 to 1.6 mols of water per mol of the phosphorus pentasulfide reacted together at a temperature in the range of 200° to 500° F. to produce an oil-dispersible reaction product suitable for addition to a lubricating oil.

5. The reaction product of 20 to 50 parts by weight of phosphorus pentasulfide to 80 to 50 parts of motor polymer and 3 to 5 parts of water reacted together at a temperature in the range of 200° to 500° F. to produce an oil-dispersible reaction product suitable for addition to a lubricating oil.

6. The reaction product of about 38 parts of phosphorus pentasulfide, about 62 parts motor polymer and about 4 parts of water reacted together at a temperature in the range of 200° to 500° F. to produce an oil-dispersible reaction product suitable for addition to a lubricating oil.

7. A mineral lubricating oil composition containing 0.5 to 50% of the reaction product of one mol of an olefin, 0.2 to 2.0 mols of a phosphorus sulfide, and 0.5 to 3 mols of water per mol of the phosphorus sulfide, the water being mixed and reacted with the phosphorus sulfide at least as soon as the olefin is mixed and reacted therewith, the reaction temperature being in the range of 200° to 500° F., to produce an oil dispersible reaction product suitable for addition to a lubricating oil.

8. A mineral lubricating oil composition containing 0.5 to 50% of the reaction product of one mol of an olefin, 0.2 to 2.0 mols of phosphorus pentasulfide, and 0.5 to 3 mols of water per mol of the phosphorus sulfide reacted together at a temperature in the range of 200° to 500° F. to produce an oil-dispersible reaction product suitable for addition to a lubricating oil to form a reaction product having less than 10% pentane insolubles.

9. A mineral lubricating oil composition containing 0.5 to 50% of the reaction product of one mol of an olefin, 0.2 to 2.0 mols of phosphorus pentasulfide, and 1 to 1.6 mols of water per mol of the phosphorus pentasulfide reacted together at a temperature in the range of 200° to 500° F. to produce an oil-dispersible reaction product suitable for addition to a lubricating oil.

10. A mineral lubricating oil composition containing 0.5 to 50% of the reaction product of one mol of an olefin, 0.25 to 0.75 mols of phosphorus pentasulfide, and 1 to 1.6 mols of water per mol of the phosphorus pentasulfide reacted together at a temperature in the range of 200° to 500° F. to produce an oil-dispersible reaction product suitable for addition to a lubricating oil.

11. A mineral lubricating oil composition containing 0.5 to 50% of the reaction product of 20 to 50 parts by weight of phosphorus pentasulfide to 80 to 50 parts of motor polymer and 3 to 5 parts of water reacted together at a temperature in the range of 200° to 500° F. to produce an oil-dispersible reaction product suitable for addition to a lubricating oil.

12. A mineral lubricating oil composition containing 1 to 10% of the reaction product of about 38 parts of phosphorus pentasulfide, about 62 parts motor polymer and about 4 parts of water reacted together at a temperature in the range of 200° to 500° F. to produce an oil-dispersible reaction product suitable for addition to a lubricating oil.

JOHN D. BARTLESON.

REFERENCES CITED

The following references are of record in the file of this patent:

UNITED STATES PATENTS

| Number | Name | Date |
| --- | --- | --- |
| 2,316,079 | Loane | Apr. 6, 1943 |
| 2,351,763 | Hull | June 20, 1944 |
| 2,413,648 | Ott | Dec. 31, 1946 |